United States Patent Office 3,006,930
Patented Oct. 31, 1961

3,006,930
16-ETHERS AND 16,17-CYCLOBORATE ESTERS OF 16α,17α-DIHYDROXYPROGESTERONE AND PROCESS OF PREPARING
Josef Fried, Princeton, N.J., assignor to Olin Mathieson Chemical Corporation, New York, N.Y., a corporation of Virginia
No Drawing. Filed Dec. 11, 1958, Ser. No. 779,532
10 Claims. (Cl. 260—397.4)

This invention relates to, and has for its object the provision of, a method of preparing physiologically active steroids, and to the physiologically active steroids produced thereby.

The steroids of this invention include: (a) 16α,17α-dihydroxyprogesterone 16α,17α-cycloborate; and (b) 16-ethers of the general formula

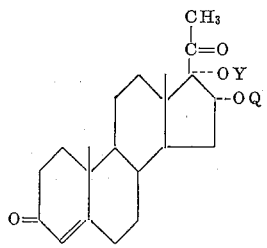

wherein Q is alkyl or aralkyl and Y is hydrogen or the acyl radical of a hydrocarbon carboxylic acid of less than twelve carbon atoms.

The 16α,17α-cycloborate ester of this invention is prepared by interacting 16α,17α-dihydroxyprogesterone with boric acid anhydride. The reaction is preferably carried out by treating a suspension or solution of the steroid with the boric acid anhydride in an organic solvent, such as methanol, at an elevated temperature, such as the reflux temperature of the organic solvent.

The ethers of this invention are prepared by interacting the cycloborate ester with a diazo compound of the formula, Q'N$_2$ wherein Q' is alkylidene or aralkylidene, preferably of less than ten carbon atoms as exemplified by the lower alkylidenes (e.g. diazomethane and diazoethane) and the monocyclic ar(lower alkylidenes) (e.g. phenyl-diazomethane). The reaction is conducted in the presence of water or an alcohol, such as a lower alkanol, at any normal temperature, such as ambient temperature.

The resulting free 17α-hydroxyl compound (Y is hydrogen) can then be esterified by treating with an acid anhydride or acyl halide in an inert solvent (e.g. benzene) in the presence of an acid catalyst (e.g. p-toluenesulfonic acid). Among the suitable reactants for this reaction may be mentioned the anhydrides of hydrocarbon carboxylic acids having less than twelve carbon atoms, as exemplified by the lower alkanoic acids (e.g., acetic, propionic and hexanoic acids), the monocyclic aromatic carboxylic acids (e.g. benzoic acid), the monocyclic aralkanoic acids (e.g. phenacetic and β-phenylpropionic acids), the lower alkenoic acids, the lower cycloalkane carboxylic acids, and the lower cycloalkene carboxylic acids.

All of the compounds of this invention are physiologically-active substances which possess progestational activity and hence can be used in lieu of known progestational agents in the treatment of such diseases and conditions as habitual or threatened abortion, amenorrhea and premenstrual tension, for which purpose they are administered in the same manner as progesterone, for example, the dosage being adjusted for the relative potency of the particular steroid.

The following examples are illustrative of the invention (all temperatures being in centigrade):

EXAMPLE 1

*16α,17α-dihydroxyprogesterone 16α,17α-cycloborate*

A solution of 500 mg. of 16α,17α-dihydroxyprogesterone and 2.5 g. of boron trioxide in 25 ml. of methanol is refluxed for 1 hour. After cooling, the solution is concentrated to a volume of 20 ml. in vacuo and 40 ml. of water is added. The resulting precipitate of the cycloborate is removed by filtration.

EXAMPLE 2

*16α-methoxy-17α-hydroxyprogesterone*

To a solution of 150 mg. of 16α,17α-dihydroxyprogesterone cycloborate in 2 ml. of methanol is added sufficient ethereal diazomethane to maintain a yellow color. After removal of the solvents in vacuo the residue is taken up in chloroform and water, the chloroform washed with water and the solvent removed in vacuo. The residual 16α-methoxy-17α-hydroxyprogesterone after recrystallization from 95% ethanol has the following properties: M.P. about 142–143°; $[\alpha]_D^{23}+60°$ (c, 0.15 in chlf.);

$\lambda_{max.}^{alc.}$ 234 m$\mu$ ($\epsilon=15,400$); $\lambda_{max.}^{Nujol}$ 2.92, 5.88, 5.98, 6.20 $\mu$

*Analysis.*—Calcd. for $C_{22}H_{32}O_4$ (360.48): C, 73.30; H, 8.95; OMe, 8.60. Found: C, 73.06; H, 8.89; OMe, 7.89.

EXAMPLE 3

*16α-ethoxy-17α-hydroxyprogesterone*

Substituting an equivalent amount of diazoethane for the diazomethane in Example 2, there is obtained 16α-ethoxy-17α-hydroxyprogesterone.

Similarly, by substituting diazophenylmethane for the diazomethane in Example 2, there is obtained 16α-benzyloxy-17α-hydroxyprogesterone.

EXAMPLE 4

*16α-methoxy-17α-hydroxyprogesterone caproate*

A mixture of 300 mg. of 16α-methoxy-17α-hydroxyprogesterone, 16 mg. of p-toluenesulfonic acid, monohydrate, 0.5 ml. of hexanoic anhydride and 10 ml. of dry benzene is heated at 80° until a clear solution is obtained. The mixture is allowed to remain at room temperature for 22 hours, after which time ice is added and the excess anhydride is decomposed by stirring for two hours at room temperature. The mixture is taken up in chloroform, extracted with water and dilute bicarbonate and again with water. The chloroform solution is then dried over sodium sulfate and the solvent removed in vacuo. The residue represents the 17-caproate of 16α-methoxy-17α-hydroxyprogesterone.

EXAMPLE 5

*16α-methoxy-17α-hydroxyprogesterone acetate*

Using the conditions of Example 4 but substituting 0.4 ml. of acetic anhydride for the hexanoic anhydride used in Example 4 there is obtained the 17α-acetate of 16α-methoxy-17α-hydroxyprogesterone.

Similarly, by substituting 16α-ethoxy-17α-hydroxyprogesterone and 16α-benzyloxy-17α-hydroxyprogesterone for the steroid in the procedures of Examples 4 and 5, 16α-ethoxy-17α-hydroxyprogesterone caproate, 16α-ethoxy-17α-hydroxyprogesterone aceate, 16α-benzyloxy-17α-hydroxyprogesterone caproate and 16α-benzyloxy-17α-hydroxyprogesterone acetate are obtained respectively.

The invention may be variously otherwise embodied within the scope of the appended claims.
What is claimed is:
1. 16α,17α-dihydroxyprogesterone 16α,17α-cycloborate.

2. A steroid of the general formula

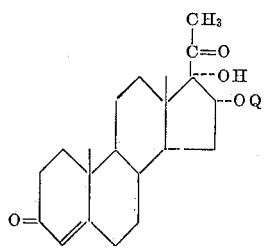

wherein Q is selected from the group consisting of alkyl of less than ten carbon atoms and aralkyl of less than ten carbon atoms and Y is selected from the group consisting of hydrogen and the acyl radical of a hydrocarbon carboxylic acid of less than twelve carbon atoms.

3. 16α-(lower alkoxy)-17α-hydroxyprogesterone.
4. The ester of 16α-(lower alkoxy)-17α-hydroxyprogesterone with a hydrocarbon carboxylic acid of less than twelve carbon atoms.
5. 16α-methoxy-17α-hydroxyprogesterone.
6. 16α-ethoxy-17α-hydroxyprogesterone.
7. 16α-methoxy-17α-hydroxyprogesterone caproate.
8. 16α-methoxy-17α-hydroxyprogesterone acetate.
9. A process for preparing a steroid of the general formula

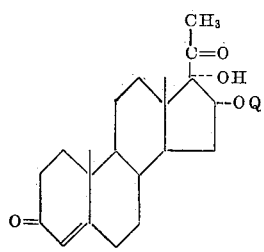

wherein Q is selected from the group consisting of alkyl of less than ten carbons atoms and aralkyl of less than ten carbon atoms, which comprises interacting 16α,17α-dihydroxyprogesterone 16α,17α-cycloborate with a compound selected from the group consisting of diazoalkane and diazoaralkane, wherein the alkane and aralkane radicals have less than ten carbon atoms, in the presence of a compound selected from the group consisting of water and lower alkanol, and recovering the 16α-ether formed.

10. A process for preparing the 17α-esters of a compound selected from the group consisting of 16α-alkoxy-17α-hydroxyprogesterone and 16α-aralkoxy-17α-hydroxyprogesterone with hydrocarbon carboxylic acids of less than twelve carbon atoms, which comprises interacting a compound selected from the group consisting of 16α-alkoxy-17α-hydroxyprogesterone and 16α-aralkoxy-17α-hydroxyprogesterone with a compound selected from the group consisting of the acid anhydrides and acyl halides of a hydrocarbon carboxylic acid having less than twelve carbon atoms, in the presence of an acid catalyst.

References Cited in the file of this patent
UNITED STATES PATENTS

| | | |
|---|---|---|
| 2,183,589 | Reichstein et al. | Dec. 19, 1939 |
| 2,716,125 | Hirschmann et al. | Aug. 23, 1955 |
| 2,727,909 | Colton | Dec. 20, 1955 |
| 2,753,360 | Kaspar et al. | July 3, 1956 |
| 2,831,003 | Thomas | Apr. 15, 1958 |

UNITED STATES PATENT OFFICE
CERTIFICATE OF CORRECTION

Patent No. 3,006,930                                October 31, 1961

Josef Fried

It is hereby certified that error appears in the above numbered patent requiring correction and that the said Letters Patent should read as corrected below.

Column 3, lines 2 to 12, the formula should appear as shown below instead of as in the patent:

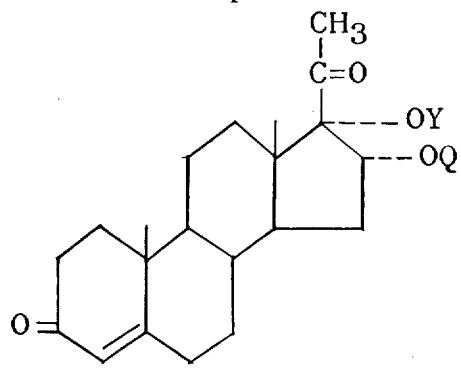

Signed and sealed this 8th day of May 1962.

(SEAL)
Attest:

ERNEST W. SWIDER
Attesting Officer

DAVID L. LADD
Commissioner of Patents